(No Model.) 2 Sheets—Sheet 1.
J. GRAHAM.
CUT-OFF VALVE.
No. 283,773. Patented Aug. 28, 1883.
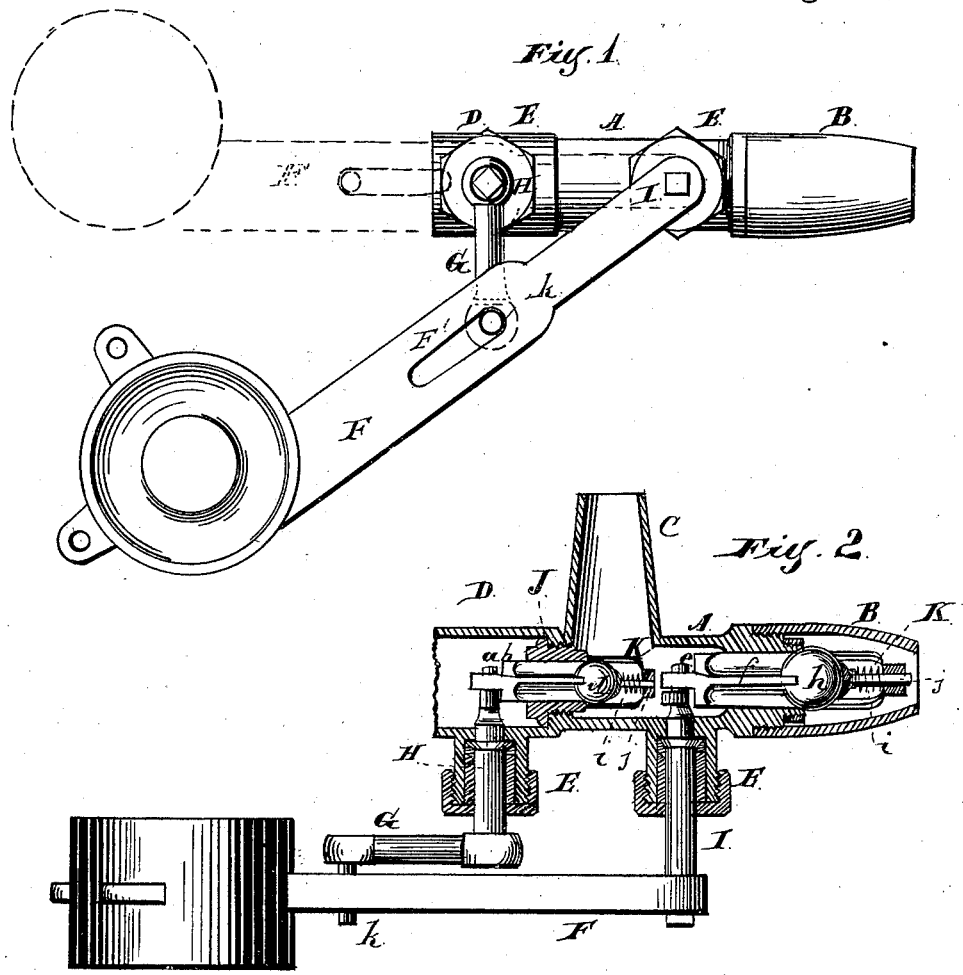
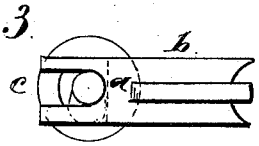
Witnesses:
Albert H. Adams.
J. F. Bruns
Inventor:
John Graham (No Model.)

J. GRAHAM.
CUT-OFF VALVE.

No. 283,773. Patented Aug. 28, 1883.

Witnesses:
Albert H. Adams.
H. F. Brims.

Inventor:
John Graham

UNITED STATES PATENT OFFICE.

JOHN GRAHAM, OF CHICAGO, ILLINOIS.

CUT-OFF VALVE.

SPECIFICATION forming part of Letters Patent No. 283,773, dated August 28, 1883.

Application filed February 23, 1883. (No model.)

*To all whom it may concern:*

Be it known that I, JOHN GRAHAM, residing at Chicago, in the county of Cook and State of Illinois, and a citizen of the United States, have invented a new and useful Improvement in Cut-Off Valves, of which the following is a full description, reference being had to the accompanying drawings, in which—

Figure 5:
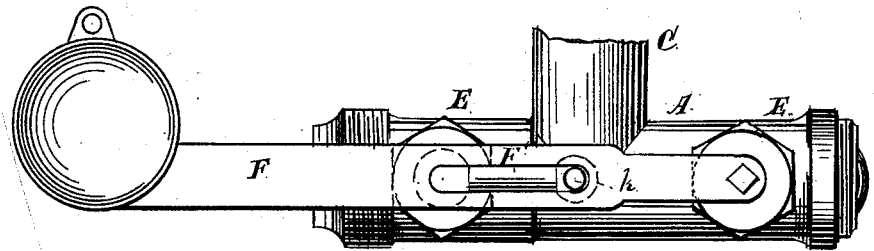
Figure 6:
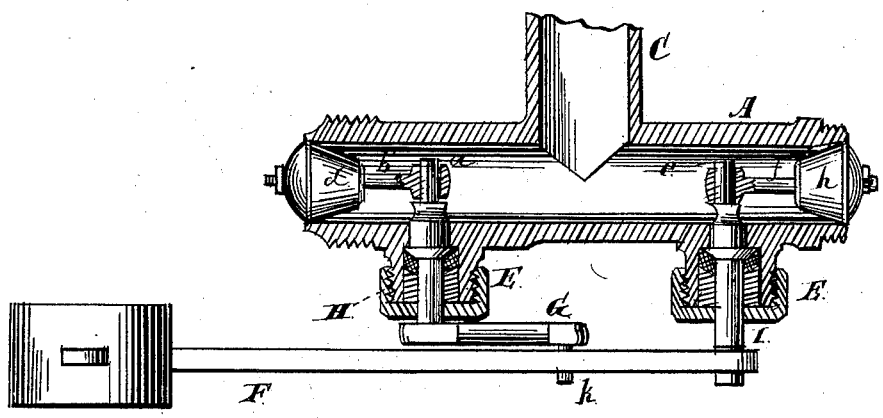
Figure 7:
Figure 8:

Figure 1 is a side view; Fig. 2, a horizontal section of Fig. 1; Figs. 3 and 4, details showing the slides used for moving the valves; Fig. 5, side view of a slightly-modified form of the cut-off; Fig. 6, a horizontal section of Fig. 5; Figs. 7 and 8, details.

The object of this invention is to improve the construction and operation of cut-offs for water-service pipes generally, and to so arrange the valves and their parts that when the cut-off is either open or closed water from the pipe connecting with the main cannot flow through and out at the waste-pipe in any position in which the valves may be placed; and it consists in the several improvements and combinations of parts hereinafter described and claimed as new.

In the drawings, A indicates the body of the cut-off; B, coupling for connecting the water-pipe leading from the main; C, coupling for a stand or service pipe; D, waste-pipe; E, stuffing-boxes; F, weighted lever; F', slot or opening in lever F; G, crank-arm; H I, shafts; J, valve-seat; K, valve-cages; $a$, crank-pin on, or portion of shaft H; $b$, valve slide or support; $c$, fork or opening in valve-slide; $d$, waste-pipe valve; $e$, crank-pin on, or part of shaft I; $f$, valve support or slide; $g$, fork or opening in the slide $f$; $h$, valve for shutting off the flow of water; $i$, springs; $j$, valve-stem; $k$, pin on crank G; $b'$ $f'$, valve stems or couplings.

This device is, by preference, made of brass, with the exception of the weighted lever, which may be of cast-iron, and the central portion or case, A, is made in the form shown, and it is provided with the usual connections or couplings, B C, and a waste-pipe, D.

The part A is provided with shafts H and I, the shaft H operating the waste-valve $d$ and the shaft I the water or supply valve $h$.

The valve-seat J and its cage K for the valve $d$, as seen in Fig. 2, are of a single piece screwed into the interior of the central part, A, while the valve-seat of the valve $h$ is formed by the end of the said part A, the cage of the valve $h$ being secured by a ring screwed onto the end of the part A. These valves, as shown at Fig. 2, are supported against the water-pressure by slides $b$ $f$, which are fluted or cut away to form water-passages along their length, as shown. The valves are prevented from getting out of operative position by their stems $j$, springs $i$, and cages K.

The inner ends of the shafts H I are bent or otherwise formed, so as to have a crank action, the crank $a$ working in the slot or opening $c$ of the slide $b$, so as to force the valve $d$ open, while the water-pressure and spring $i$ hold it in the opposite direction, or closed. The crank $e$ of the shaft I operates the slide $f$ to open the valve $h$ against the pressure of the water, while the water-pressure and the spring $i$ reseat the valve when the pressure of the crank $e$ is removed.

The shafts H I are both operated by the lever F, and in the form shown in Fig. 2 they are rotated or rocked in the same direction. The connection of the weighted lever F with the shaft I is direct, while its connection with the shaft H is by the lever or crank-arm G, the pin $k$, and slot F', and in this form the waste-valve $d$ is operated against the pressure of the water by the force applied to lift the weight, and is held closed by the weight when it is down, while the valve $h$ is held open when the weight is down, the position of the valves, as shown at Fig. 2, being that which they occupy when the weighted lever is in the position shown by the dotted lines of Fig. 1, and in operation the crank or crank-pin $a$ does not commence to press against the slide $b$ until the crank-arm G is in the position indicated by the dotted lines of Fig. 1, from which point its upward movement tends to press the valve $d$ inward and to open the passage to the waste-pipe D. It will also be seen that when the weighted lever is raised to the horizontal position indicated the valve $h$ has become seated, so that water from the connection with the main ceases to flow in, and the continued movement of the crank-pin $e$ of the shaft I from this position simply permits the slide $f$ to press back and further compress the valve $h$, so that, however much the weighted lever F may be raised from its horizontal position, no flow of water takes place into the central portion or casing, A.

By this arrangement it is not possible to open the waste-valve before the supply-valve is closed, and therefore no water can flow through the casing and thus produce an unnecessary or injurious waste of water, as only that can escape which is in the stand-pipe or service-pipe connected with the coupling C, and, as will be further seen, when the lever F is in the half-way position both valves are closed, so that with a stoppage at this point water will neither flow in nor out, as is the case with shut-off cocks of an ordinary construction, where the half-way stoppage permits the water to flow right through from the supply into the waste.

The slides $b\ f$ are opened at their connections $c\ g$ with the shafts, so that they are only operated in one direction by the crank, and this form is preferred where both valves are arranged with the water-pressure in the direction of seating or closing them, as then no special adjustment of length is required to give the valves their seating or to compensate for wear.

The form shown in Fig. 5 is modified in respect to the rocking or special rotation of the shafts, as in this form, by turning the crank-arm G over, the valve-shafts are made to rock in opposite directions, and in this form the valve-stems $b'\ f'$ are passed through the valves and directly attached to the cranks $a\ e$, so as to give the valves a positive movement in both directions. The forms of the valve are also so modified as to dispense with the cages K and springs $i$; but the operation of the two valves in respect to opening and closing is the same, and also in respect to the water from the main passing directly through and out at the waste-pipe in any position of the valves, and in respect to the movement of the shafts H I by the weighted lever.

The central portion of the case A of Fig. 6 is to be provided with pipes or couplings B and D, the same as in Fig. 2. The stuffing-boxes E being of the ordinary construction, are not described at length; but their construction will be apparent from the drawings.

As described and shown, the supply-valves are open when the weight is down. It will, however, be understood that by turning the shafts H I half around the operating position of the lever F will be reversed, as then the supply-valve $h$ will be open when the lever is at its highest point and the waste-valve $d$ closed.

What I claim as new, and desire to secure by Letters Patent, is—

1. The combination of the shaft H, arm G, shaft I, and valves $d$ and $h$, respectively, connected with the said shafts, with the slotted actuating lever or arm F, connected with the shaft I, and arm G, substantially as and for the purpose described.

2. The combination of the shafts H I, having eccentrics or cranks on their inner ends, with the valves $d\ h$ and their connections or couplings, substantially as described.

3. The combination of the shafts H and I, having eccentrics or cranks $a$ and $e$, arranged and combined with supply and waste valves and their connections or couplings, and an operating-lever to close or open either valve before the other is opened or closed, substantially as specified.

JOHN GRAHAM.

Witnesses:
O. W. BOND,
ALBERT H. ADAMS.